(12) United States Patent
Clausen

(10) Patent No.: US 11,892,085 B2
(45) Date of Patent: Feb. 6, 2024

(54) HEAT EXCHANGER VALVE

(71) Applicant: Danfoss A/S, Nordborg (DK)

(72) Inventor: Anders Østergaard Clausen, Ry (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/882,839

(22) Filed: Aug. 8, 2022

(65) Prior Publication Data

US 2023/0059416 A1    Feb. 23, 2023

(30) Foreign Application Priority Data

Aug. 20, 2021   (EP) .................................. 21192339

(51) Int. Cl.
| | | |
|---|---|---|
| *F16K 1/52* | (2006.01) | |
| *F16K 1/38* | (2006.01) | |
| *F16K 27/02* | (2006.01) | |

(52) U.S. Cl.
CPC .............. *F16K 1/523* (2013.01); *F16K 1/385* (2013.01); *F16K 27/0254* (2013.01)

(58) Field of Classification Search
CPC .......... F16K 1/523; F16K 1/385; F16K 1/526; F16K 27/0254
See application file for complete search history.

(56) References Cited

U.S. PATENT DOCUMENTS

| | | | | |
|---|---|---|---|---|
| 1,558,330 A | * | 10/1925 | Bain ....................... | F16K 1/526 |
| | | | | 137/625.3 |
| 3,443,591 A | * | 5/1969 | Carlson ................... | F16K 35/04 |
| | | | | 251/297 |
| 3,751,003 A | * | 8/1973 | Kass ....................... | F16K 5/0214 |
| | | | | 251/312 |
| 4,518,147 A | | 5/1985 | Andresen et al. | |
| 5,580,029 A | * | 12/1996 | Bjerggaard ............... | F16K 3/32 |
| | | | | 251/208 |

FOREIGN PATENT DOCUMENTS

| | | |
|---|---|---|
| DE | 1 771 815 U | 8/1958 |
| DE | 43 25 738 A1 | 2/1995 |
| EP | 0 239 753 A2 | 10/1987 |
| EP | 1 898 134 A2 | 3/2008 |
| EP | 3 763 975 A1 | 1/2021 |

* cited by examiner

*Primary Examiner* — Patrick C Williams
(74) *Attorney, Agent, or Firm* — McCormick, Paulding & Huber PLLC

(57) ABSTRACT

A heat exchanger valve includes a housing (2) having an inlet, an outlet a valve seat (5) on a valve seat member (24) between inlet and outlet, a valve element cooperating with the valve seat (5) and having a valve element axis, and presetting mechanism having a bushing (9) which is rotatable around the valve element axis and has an opening arrangement cooperating with a counter passage in the housing (2), wherein in the region of the opening arrangement the bushing (9) has a conical form cooperating with a conical counter face (13) and a distance is provided between the bushing (9) and the valve seat member (24). Such a heat exchanger valve should allow a precise pre-setting over a large range. To this end the bushing (9) has at least two notches (14) in an edge (10) facing the valve element member (24), each of the notches (14) forming an opening (25).

15 Claims, 5 Drawing Sheets

HEAT EXCHANGER VALVE

CROSS-REFERENCE TO RELATED APPLICATION

This application claims foreign priority benefits under U.S.C. § 119 from European Patent Application No. 21192339.6, filed Aug. 20, 2021, the content of which is hereby incorporated by reference in its entirety.

TECHNICAL FIELD

The present invention relates to a heat exchanger valve comprising a housing having an inlet, an outlet, a valve seat on a valve seat member between inlet and outlet, a valve element cooperating with the valve seat and having a valve element axis, and presetting means having a bushing which is rotatable around the valve element axis and comprises an opening arrangement cooperating with a counter passage in the housing, wherein in the region of the opening arrangement the bushing has a conical form cooperating with a conical counter face and a distance is provided between the bushing and the valve seat member.

BACKGROUND

Such a heat exchanger valve is known, for example, from EP 0 239 753 A2.

A heat exchanger valve is used to control a flow of heat carrying fluid through a heat exchanger, for example through a radiator. To this end the distance between valve element and valve seat is adjusted.

The pre-setting means are used to adapt the heat exchanger valve to the throttling resistance of the heat exchanger and associated piping, so that each heat exchanger is supplied with the same flow of heat carrying fluid, when the valve is in fully open condition.

Most of the pre-setting means presently used comprise a slot in a circumferential wall, the slot having an extension in axial direction increasing in circumferential direction. Such a pre-setting means has an unlimited number of possible angular positions. Thus, it is difficult for the installer to correctly adjust the pre-setting means.

SUMMARY

The object underlying the invention is to have pre-setting means allowing a precise pre-setting over a large range.

This object is solved in that that the bushing comprises at least two notches in an edge facing the valve element member, each of the notches forming an opening.

In this way it is possible to more precisely adjust the pre-setting. There are only a number of possible pre-settings, wherein each pre-setting is defined by the overlap between the counter passage and one or more notches. Pre-setting is made by choosing a suitable combination of one notch or more notches. Nevertheless, the pre-setting means are tight in the sense, that no fluid can pass the pre-setting means other than through the opening or openings formed by the notch or notches. The tightness is achieved by the combination of the conical form of the bushing and of the counter face.

In an embodiment of the invention at least one of the notches continues in a groove on an outer side of the bushing. The groove forms a flow path for the fluid passing through the notch. However, the groove has no influence on the throttling resistance of the opening formed by the notch.

In an embodiment of the invention in the region of the counter passage the bushing is supported by the counter face at the end adjacent the valve element member. The bushing is supported by the conical counter face on both sides of each notch in circumferential direction. This contributes to the tightness of the pre-setting means.

In an embodiment of the invention at least three notches are provided, wherein at least two notches are of different size and at least two of the notches are of the same size. In this way it is possible to adjust the pre-setting by choosing one opening or two openings, wherein in the second case the flow through the pre-setting means is doubled.

In an embodiment of the invention the at least two notches of the same size are the notches having the smallest size. Thus, the pre-setting can start with a small flow through the heat exchanger valve.

In an embodiment of the invention at least two of the notches have different extensions in a direction parallel to the valve element axis. The height of the notch, i.e. the extension in the direction parallel to the valve element axis, can be used to define the size of an opening formed by the notch. The height can be formed in a simple way with high precision, so that manufacturing of the bushing does not produce very high costs. The bushing can be formed, for example, by injection molding. If necessary, the height of the notches can be adjusted afterwards by machining.

In an embodiment of the invention the counter passage is dimensioned to overlap at least two notches. This means that the counter passage can overlap the two notches of the same size or it can overlap one of the two notches with the same size and a notch of a different size. Thus, already three different pre-setting adjustments can be made.

In an embodiment of the invention the counter passage is dimensioned to overlap three notches. In this way the flow can be adjusted by a combination of up to three notches. When the bushing is rotated, one notch on one side in circumferential direction can replace another notch on the other side in circumferential direction.

In an embodiment of the invention three notches of the same size are provided. In this case the flow adjusted by one of the notches of the same size can be doubled or tripled.

In an embodiment of the invention the bushing can be moved into a first angular position in which only one of the notches is in overlap with the counter passage and into a second angular position in which two notches are in overlap with the counter passage. As mentioned above, bringing notches of the same size or of different size in overlapping relation with the counter passage, different maximum flows can be adjusted.

In an embodiment of the invention the bushing can be moved into a third angular position in which three notches are in overlap with the counter passage. This increases the possibilities of adjusting the pre-setting means further. The total area available for the flow to pass the pre-setting means is now defined by a combination of three notches. These three notches can have the same size or different sizes. Thus, there are many different possibilities to combine notches.

In an embodiment of the invention the notches of different size have a size increasing in a direction away from the notch of the same size. Thus, by rotating the bushing so that the notches of the same size leave the counter passage, a notch of different size replaces the notch belonging to the group of notches of the same size. When the bushing is rotated further, the second notch belonging to the group of notches of the same size leaves the counter passage and is replaced by a notch of a different size and so on.

In an embodiment of the invention the notches of different size have an increase of size corresponding to the size of a notch belonging to the group of notches of the same size. In other words, when the size of the notch belonging to the group of notches of the same size is "A", then the notch next to the group of notches of the same size comprises a sizes of 2 A, the next notch of 3 A and so on.

In an embodiment of the invention in a circumferential direction of the bushing the middles of the notches are arranged equidistantly. The installer can rotate the bushings by an angle corresponding to the angular distance between the middles of the notches to change from one pre-setting position to another pre-setting position. Thus, pre-setting is possible in a simple way.

In an embodiment of the invention the counter face is formed at an insert mounted in the housing. This facilitates the production of the housing. The housing can be provided with a cylindrical bore accommodating the remaining parts of the valve. The insert can be made, for example, from a plastic material.

In an embodiment of the invention the bushing or means for rotating the bushing are provided with haptic feedback means. Thus, an installer feels that he has reached a certain pre-setting position. This facilitates pre-setting.

BRIEF DESCRIPTION OF THE DRAWINGS

Embodiments of the invention will now be described with reference to the drawing, in which.

DETAILED DESCRIPTION

Figure 1:
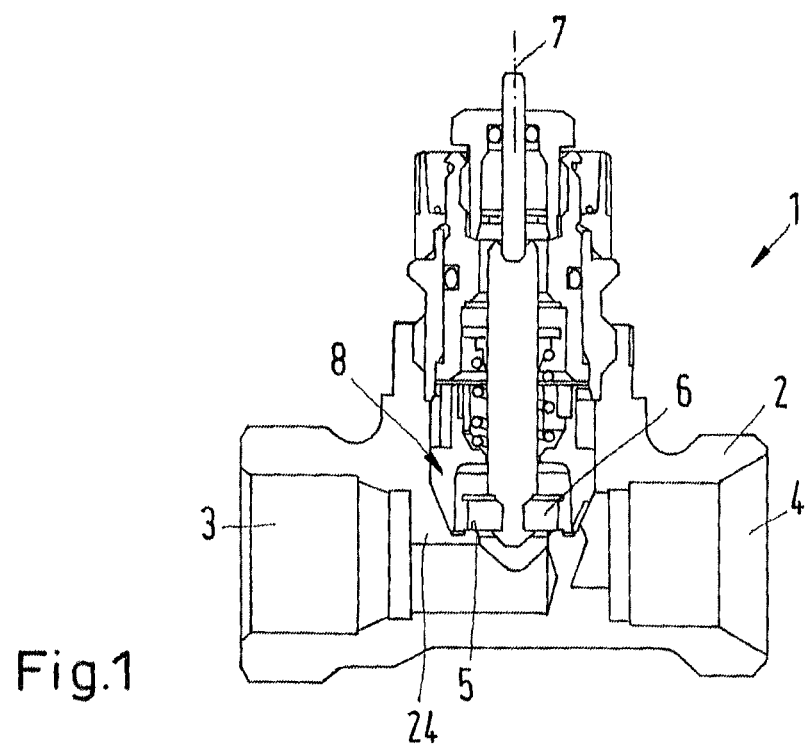
FIG. 1 shows a schematic sectional view through a heat exchanger valve.

FIG. 1 shows schematically a heat exchanger valve 1 comprising a housing 2. The housing 2 comprises an inlet 3 and an outlet 4. A valve seat 5 is arranged between the inlet 3 and the outlet 4. The valve seat 5 is arranged on a valve seat member 24 which in this example is part of the housing. A valve element 6 cooperates with the valve seat 5. A middle axis of the valve element 6 forms a valve element axis 7.

Flow through the heat exchanger valve 1 is controlled by adjusting a distance between the valve element 6 and the valve seat 5. To this end, a thermostatic actuator or any other means (not shown) can be used.

In order to limit the maximum flow through the heat exchanger valve 1, when the valve element 6 has the largest distance to the valve seat 5, pre-setting means 8 are provided. The pre-setting means 8 comprise a bushing 9 (FIG. 2) which is rotatably arranged in the housing 2. The bushing 9 comprises a lower edge 10, i. e. the edge facing the valve seat member 24, protruding into a groove 11 in the valve seat member 24. The bushing 9 has a conical face 12 starting from the edge 10. The conical face 12 cooperates with a corresponding conical counter face 13 of the housing 2. The lower edge 10 is supported by the conical counter face 13 over the whole circumference of the bushing 9.

Figure 2:
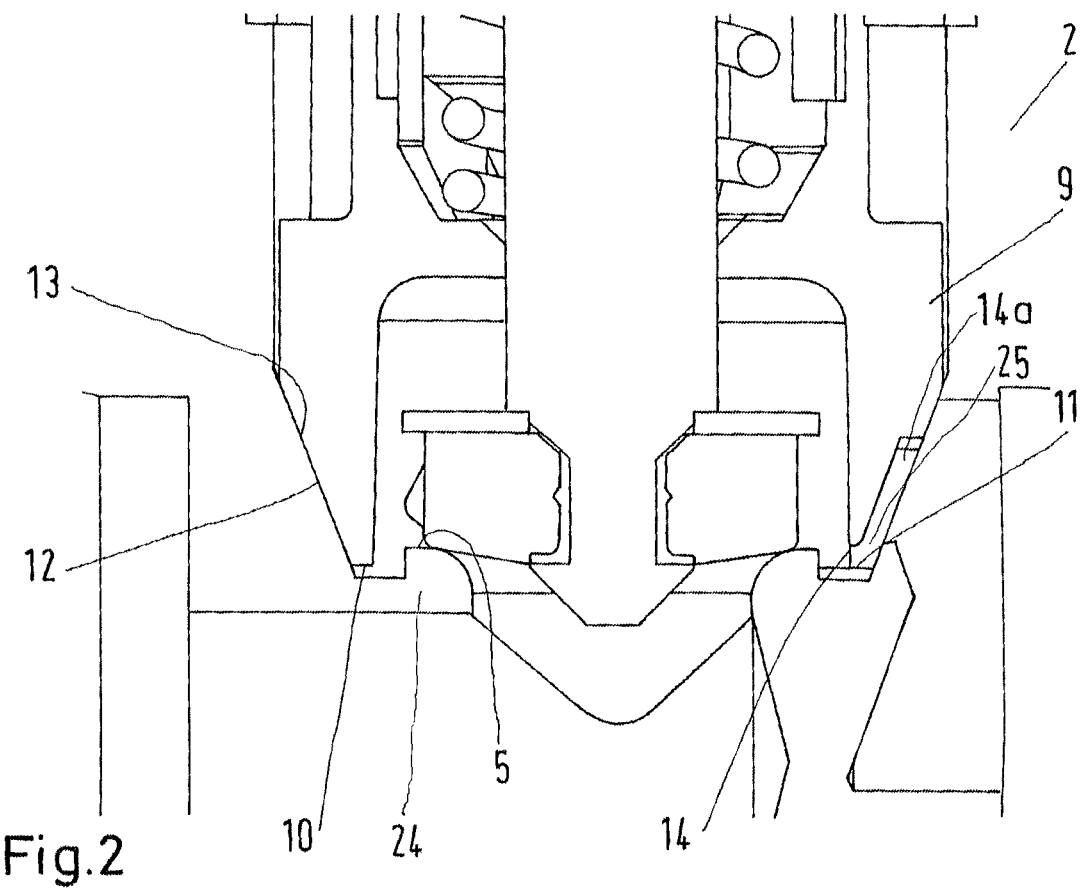
FIG. 2 shows an enlarged detail of FIG. 1.

The bushing comprises a number of notches in the edge 10. One of the notches 14 is shown in FIG. 2. The notch 14 together with the bottom of the groove 11 forms an opening 25. This opening 25 and other openings are explained in more detail in connection with FIGS. 3 to 5. The opening 25 is in the horizontal plane.

Figure 3:
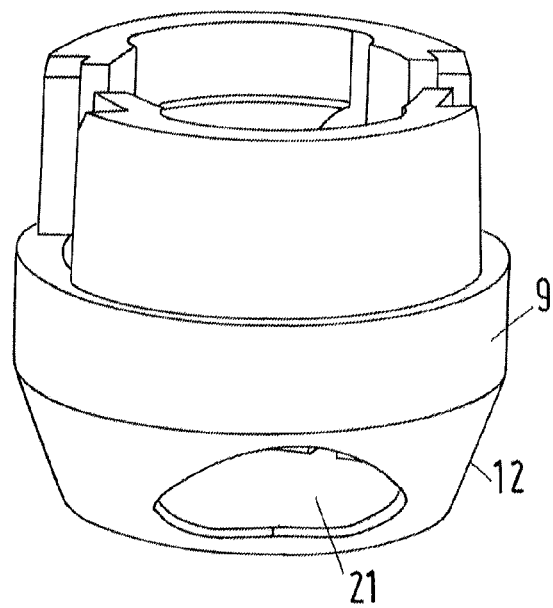
FIG. 3 shows a bushing in perspective view.
Figure 4:
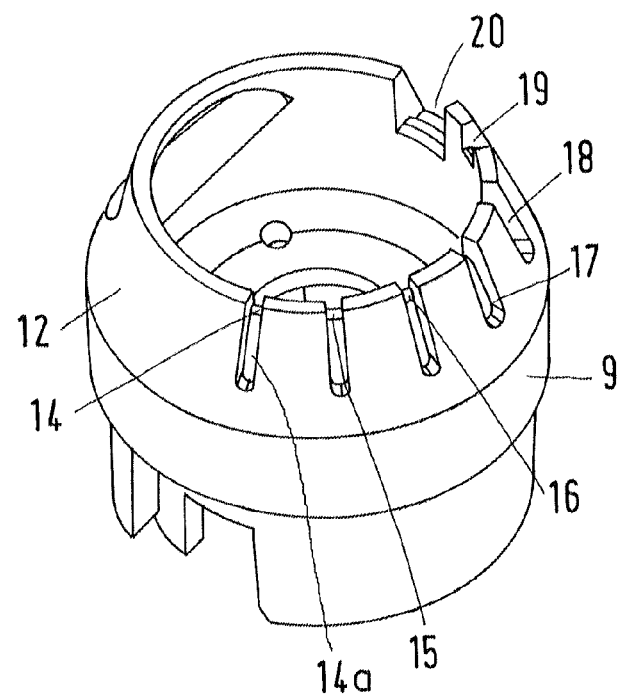
FIG. 4 shows the bushing in perspective view from another viewing angle.

FIGS. 3 and 4 show the bushing 9. The bushing 9 comprises the notch 14 shown in FIG. 2 and two other notches 15, 16 of the same size. Furthermore, the bushing 9 shows a number of notches 17, 18, 19, 20 of a different size. The size of the notches 14-20 is mainly determined by an extension of the notches 14-20 in a direction parallel to the valve element axis 7. It can be seen that this extension is rather short for the notches 14-16 and is longer for the notch 17. The largest notch 20 has in addition a larger width in circumferential direction. At least the smallest notches 14-16 continue each in a groove 14a on the radial outer side of the bushing 9.

The middles of the notches 14-20 in circumferential direction are arranged equidistantly. They can have, for example, an angular distance of 15°. Thus, turning the bushing 9 by 15° leads to another pre-setting position.

Furthermore, the bushing 9 comprises idle opening 21.

Figure 5A:
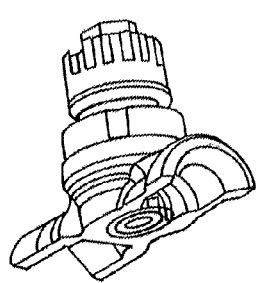
FIGS. 5a-5i show different adjustment positions of the bushing.
Figure 5B:
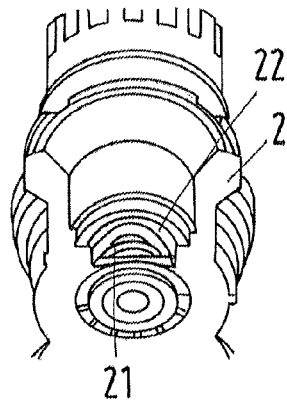

The housing comprises a counter passage 22 in form of an opening. When the idle opening 21 is in overlapping relation with the counter passage 22, there is no throttling of a flow through the valve 1 by the pre-setting means 8. This position of the bushing is shown in FIG. 5b.

Figure 5C:
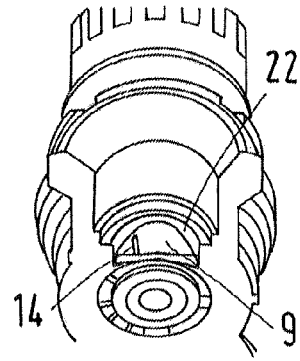
Figure 5D:
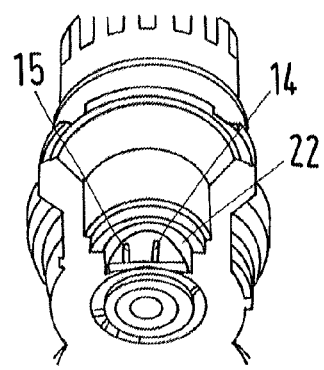
Figure 5E:
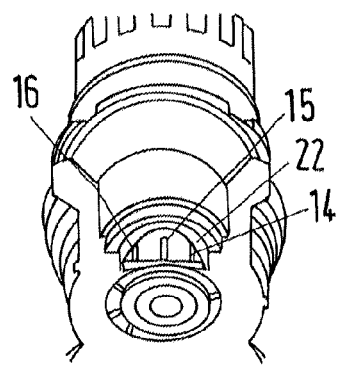

FIG. 5c shows an angular position of the bushing 9 in which the presetting means form the largest throttling resistance. Only notch 14 is in overlapping relation with the counter passage 22.

When the bushing 9 is further rotated, the second notch 15 having the same size as the notch 14 comes in overlapping relation with the counter passage 22, so that the throttling resistance is the half of the previous position and the area available for the flow to pass is doubled.

In the position shown in FIG. 5e the bushing has again rotated. Now the notches 14, 15, 16 are in overlapping relation with the counter passage 22, so that in this angular position the three notches 14-16 having the same size are available for the flow to pass. Thus, the possible flow can be tripled.

Figure 5F:
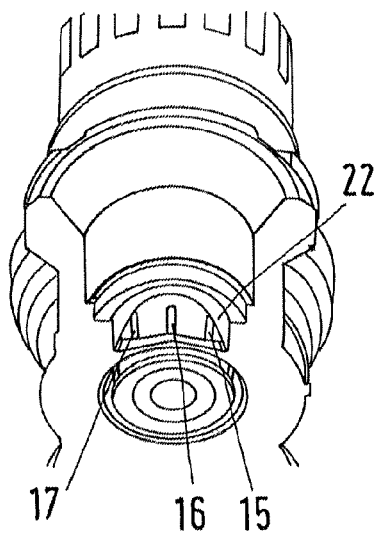

When the bushing is further rotated, as shown in FIG. 5f, the notch 14 leaves the counter passage 22 and the notch 17 enters the counter passage 22. Notch 17 is larger than each of the notches 14, 15, 16 of the same size. Notch 17 can have a size or an area which is double of that of notch 16. Thus, FIG. 5f shows a situation in which the flow through the pre-setting means is four times the flow through only opening formed by notch 14.

Figure 5G:
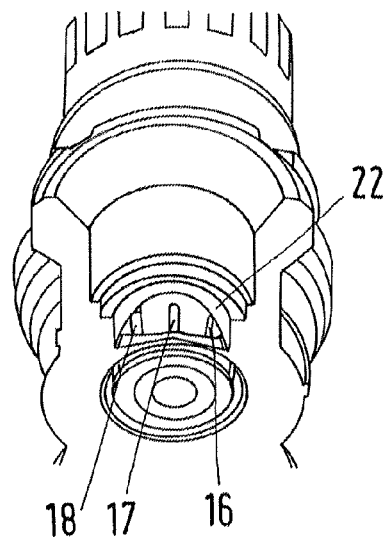

FIG. 5g shows the situation in which the bushing has further been rotated. Notch 15 has left the counter passage 22 and notch 18 enters the counter passage 22. notch 18 can be, for example, larger than notch 17 by the size of the notch 16. Thus, when the size of notch 16 belonging to the notches of the same size equals A, then the size of notch 17 next to the group of notches of the same size equals 2A and the size of the next notch 18 equals 3 A. Thus, in FIG. 5g the throttling resistance of the pre-setting means is only one sixth of the throttling resistance of the situation in FIG. 5c, where only the smallest notch 14 is available.

It should be noted, however, that the size of the larger notches 17-20 can freely be chosen in order to meet the requirements.

It is, for example, to double the size of the increasing notches 17-20 from notch to notch.

Figure 5H:
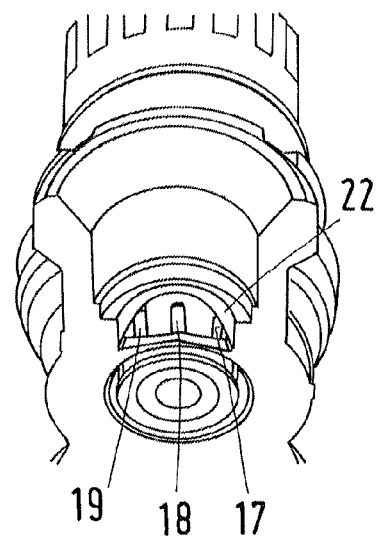

FIG. 5h shows the situation in which the bushing 9 has further been rotated so that notch 16 leaves the counter passage 22 and notch 19 enters the counter passage 22. Since notch 19 is even larger than notches 17 and 18, the possible flow is further increased.

Figure 5I:
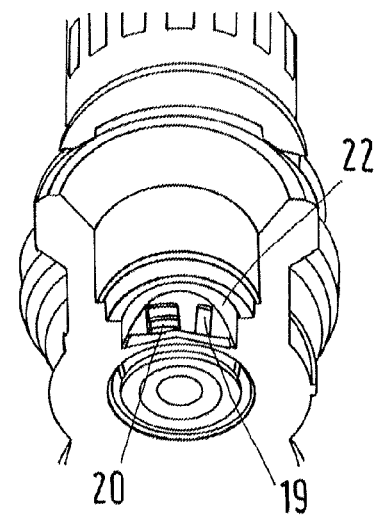

In the situation shown in FIG. 5i notch 17 has left the counter passage 22 and only notches 19 and 20 are in overlap with the counter passage 22. This is the largest pre-setting possible.

When, for example, the middles of the notches 14-20 in the circumferential direction have an angular distance of 15°, the pre-setting is further facilitated. It is not necessary to reach a precisely defined angular position of the bushing 9. A tolerance of ±7.5° is allowable.

In a way not shown the bushing or means for rotating the bushing are provided with haptic feedback means. This haptic feedback means can produce a noise, for example a "click", when the bushing reaches a defined pre-setting position. The installer can then recognize that a certain pre-setting has been reached.

Figure 6:
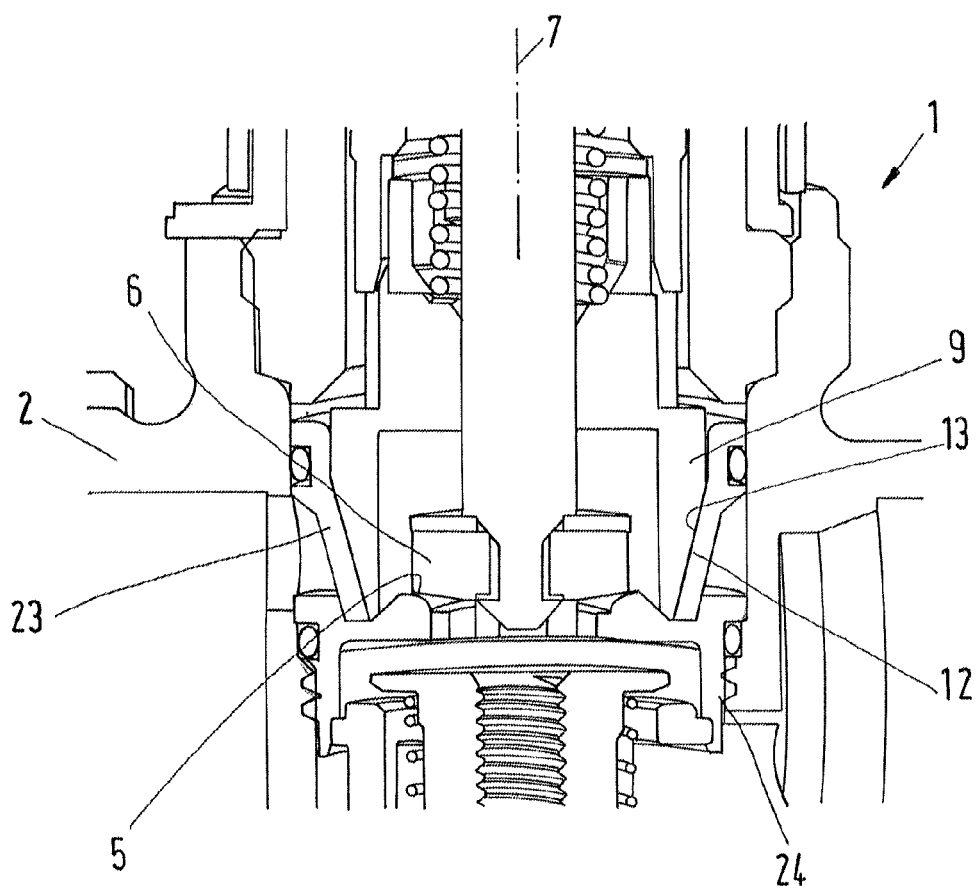
FIG. 6 shows a slightly different embodiment of the heat exchanger valve.

FIG. 6 shows a slightly different embodiment of a heat exchanger valve 1 in which the same parts are denoted with the same reference numerals.

The conical counter face 13 is now formed at an insert 23 which is mounted in the housing 2. The insert 23 can be of a plastic material.

Furthermore, the valve seat member 24 is not part of the housing, but a separate part which is screwed into the housing 2.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A heat exchanger valve comprising a housing having an inlet, an outlet, a valve seat on a valve seat member between inlet and outlet, a valve element cooperating with the valve seat and having a valve element axis, and presetting means having a bushing which is rotatable around the valve element axis and comprises an opening arrangement cooperating with a counter passage in the housing, wherein in the region of the opening arrangement the bushing has a conical form cooperating with a conical counter face and a distance is provided between the bushing and the valve seat member, wherein the bushing comprises at least two notches in an edge facing the valve element member, each of the notches forming an opening.

2. The heat exchanger valve according to claim 1, wherein at least one of the notches continues in a groove on an outer side of the bushing.

3. The heat exchanger valve according to claim 1, wherein the region of the counter passage the bushing is supported by the counter face at the end adjacent the valve element member.

4. The heat exchanger valve according to claim 1, wherein at least three notches are provided, wherein at least two notches are of different size and at least two of the notches are of the same size.

5. The heat exchanger valve according to claim 4, wherein at least two notches of the same size are notches having the smallest size.

6. The heat exchanger valve according to claim 4, wherein the notches of different size have a size increasing in a direction away from the notches of the same size.

7. The heat exchanger valve according to claim 1, wherein at least two of the notches have different extensions in a direction parallel to the valve element axis.

8. The heat exchanger valve according to claim 1, wherein the counter passage is dimensioned to overlap at least two notches.

9. The heat exchanger valve according to claim 1, wherein the counter passage is dimensioned to overlap three notches.

10. The heat exchanger valve according to claim 9, wherein three notches of the same size are provided.

11. The heat exchanger valve according to claim 1, wherein the bushing can be moved into a first angular position in which only one of the notches is in overlap with the counter passage and into a second angular position in which two notches are in overlap with the counter passage, and preferably into a third angular position in which three of the notches are in overlap with the counter passage.

12. The heat exchanger valve according to claim 1, wherein a circumferential direction of the bushing the middles of the notches are arranged equidistantly.

13. The heat exchanger valve according to claim 1, wherein the counter face is formed at an insert mounted in the housing.

14. The heat exchanger valve according to claim 1, wherein the bushing or means for rotating the bushing are provided with haptic feedback means.

15. The heat exchanger valve according to claim 1, wherein the bushing comprises a lower edge protruding into a groove in the valve seat member.

* * * * *